Nov. 1, 1966   S. A. SEYMOUR   3,282,252
LIVESTOCK FEEDER
Filed Oct. 1, 1965
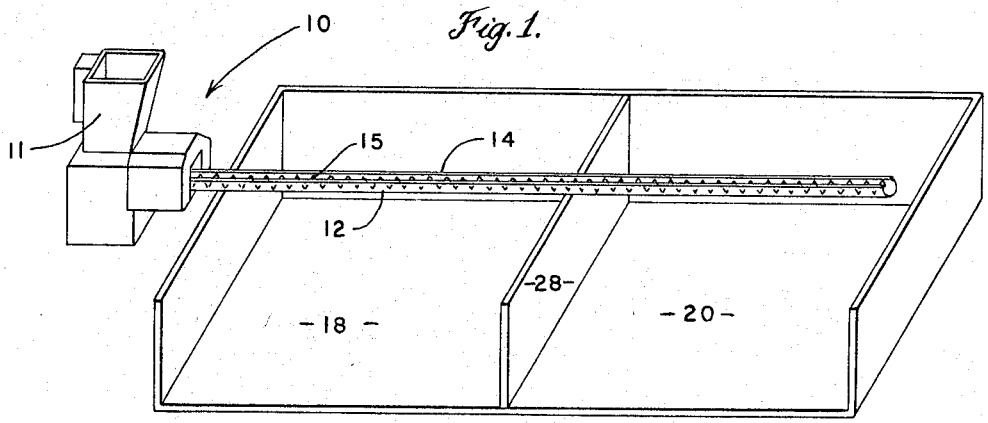
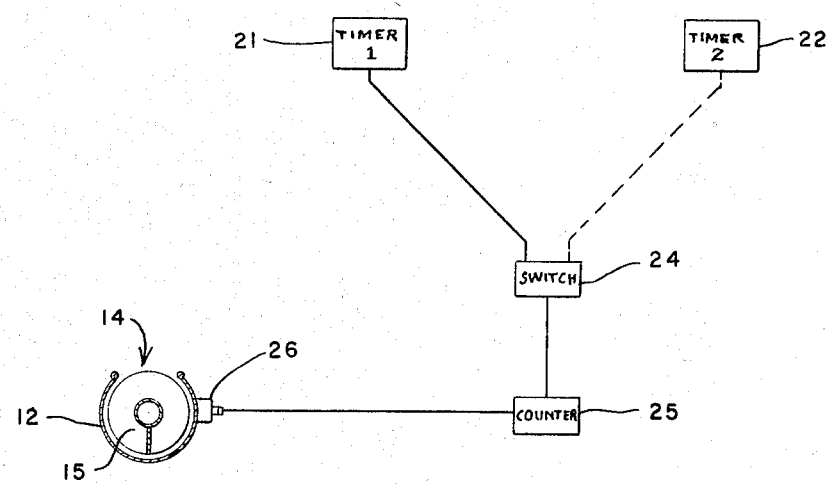
INVENTOR.
SHAUN A. SEYMOUR
BY
AGENT 3,282,252
LIVESTOCK FEEDER
Shaun A. Seymour, Ephrata, Pa., assignor to Sperry Rand Corporation, New Holland, Pa., a corporation of Delaware
Filed Oct. 1, 1965, Ser. No. 491,947
3 Claims. (Cl. 119—51.11)

This invention relates generally to the feeding of livestock. More specifically, it relates to the automatic feeding of groups of livestock having different quantitative feed requirements.

In recent years, the agricultural industry has given considerable attention to controlling and automating the operation of feeding livestock. This has been done with a view toward reducing feed waste and realizing maximum return from the feed investment as well as achieving the usual automation objectives of reducing labor, time, and cost. This effort has resulting in the practice of feeding livestock in groups, as opposed to the older practice of feeding each animal individually. A number of animals are grouped together in a feeding area. A correct amount of feed for the group is mechanically conveyed into the feeding area and discharged into an elongated feed bunk or the like whereby all the animals have access to the feed.

One particular application of automatic feeding mechanism is in a more recently developed program known as multiple-limited-feeding. Under this system, animals are fed more frequently than in the past and the total amount of feed provided each feeding is less than the quantity the animals could consume. The animals are maintained in a moderately hungry condition so that when a particular feeding occurs, they will eat all of the feed made available to them. The wasting of feed is eliminated and the animals achieve a desired weight gain with less feed. The production cost of each pound of meat is therefore lower and the animal raiser makes a higher profit.

When animals are fed on a multiple-limited-feeding basis, it is particularly important that all the animals receive their feed at the same time. Otherwise, the animals will crowd and push to have first access to the feed when it is made available. Examples of automatic feeders of a type satisfactory for use in multiple-limited-feeding systems, as well as for automatic feeding operations of a less exacting nature, may be seen in U.S. Patents 2,940,639, 3,026,845, and 3,129,851. The feeders shown in these patents are so constructed and operative that a quantity of feed is withdrawn from a supply hopper and distributed throughout the length of a feed container. The material is then deposited simultaneously along the length of the feeding station so that all animals will have feed made available to them at the same time.

Feeders of this type have proven quite satisfactory with herds of cattle, hogs, or other livestock wherein all the animals have approximately the same quantitative feed requirements. However, in the case of a farmer who has groups of animals having different quantitative feed requirements, two or more complete feeding systems are required, or one or more of the groups must be fed separately from the automatically fed group. Thus, the full advantages of automatic feeding can be presently realized to the fullest only by operators whose herds are limited to livestock having approximately the same quantitative feed requirements, or by operators having herds of different quantitative feed requirements, each of which is of a size to justify its own independent automatic feeding system.

The general object of this invention is to provide a multiple limited feeding method and apparatus capable of completely automatically feeding groups of livestock having different quantitative feed requirements.

It is another object of this invention to provide a feeding method and apparatus in accordance with the general object which is compatible with and easily incorporated into existing single group feeding systems.

These and other objects and advantages of this invention will be apparent upon reference to the following description and claims taken in conjunction with the accompanying drawings wherein:

FIG. 1 is a diagrammatic illustration of a feeding system constructed in accordance with the principles of the present invention; and FIG. 2 is a diagrammtic illustration of the elements of the present invention and their operative relationship to each other and to a regular feeding system.

Referring now to the drawings in detail, in FIG. 1 the reference numeral indicates, generally, an automatic livestock feeder of the fill and dump type. Such a feeder is disclosed in detail in U.S. Patent 3,129,851. The feeder 10 includes a supply hopper 11 for storing feed. An elongated container, or trough, 12 extends laterally from the hopper and has an open top in the form of a normally upwardly disposed full length longitudinal slot 14. An auger 15 is disposed within the trough 12 and extends the full length thereof. The trough 12 is mounted for rotation about its own longitudinal axis. Within the main housing of feeder 10 is a mechanism for metering feed from hopper 11 down into the auger trough 12, means to rotate the auger 15 to convey and distribute feed evenly along the length of the trough 12, and means to rotate the trough 12 to dump the feed therefrom. This mechanism is disclosed in detail in the above mentioned U.S. Patent 3,129,851 along with the conventional, commercially available electromechanical elements for controlling the operation of the feeder. These elements include a twenty-four hour master time clock which operates the auger 15 for a given period of time at regular selected intervals, and a synchronous, motor driven, reset timer controlling rotation of the trough 12 to effect one rotation of the auger trough after the auger has operated for a period of time sufficient to convey and distribute feed evenly from the hopper end of the trough to the remote end of the trough.

If animals were to be fed a given quantity of feed six times in a twenty-four hour period, for example, the master time clock would be se to activate the auger for a given period of time at four hour intervals. If the quantity of feed required at each feeding corresponded to three fillings of the rotatable container, for example, the master time clock would be set to operate the auger for a period of time sufficient to convey and distribute feed a linear distance equal to three times the actual length of the auger trough. The synchronous motor driven reset timer would be set to effect a 360° rotation of the trough after a period of auger rotation sufficient to fill the full length of the trough. The result would be that every four hours the auger trough would be filled and dumped three times automatically and then deactivated by the master control clock for the remainder of the four hour interval before the next feeding. Everything is operated on a time controlled basis and, therefore, requires no attention by the farmer other than to maintain feed in the main supply hopper 11.

In accordance with the objects of the present invention, two separate feeding pens indicated in FIG. 1 by the reference numerals 18 and 20, are provided. They are arranged side by side. The auger trough 12 extends from the main hopper 11 across both pens. In FIG. 2 the regular synchronous, motor driven, reset timer element of the feeding system described in U.S. Patent 3,129,851 is indicated by the reference numeral 21 and labeled timer 1. The rotatable auger tube 12 and the auger 15 are also indicated in FIG. 2 The mechanism of the present invention adds to the conventional system, in addition to the provision of two separate feeding pens, a second synchronous, motor driven, reset timer 22, connected like timer 21 to control rotation of auger tube 12, a control switch 24 connected to deactivate the first timer 21 and activate the second timer 22 when the switch 24 is thrown, an electromechanical counter 25 connected to throw switch 24, and a sensing device 26 to inform the counter of each rotation of auger trough 12. These are all conventional, commercially available electromechanical elements.

In accordance with the feeding system of the present invention, a farmer would confine a group of livestock having a maximum quantitative feed requirement in the feeding pen 18 adjacent the supply hopper end of auger trough 12. He would confine the group of livestock having the minimum quantitative feed requirement in feeding pen 20 adjacent the end of auger trough 12 remote from feed supply hopper 11. The regular timer 21 would be set for a time interval sufficient to enable auger 15 to convey and distribute material from supply hopper 11 to the remote end of auger trough 12. The second timer 22 would be set for a shorter interval corresponding to the time required for auger 15 to convey and distribute feed from hopper 11 only as far as the divider 28 (FIG. 1) separating pens 18 and 20. Assuming that the desired amount of feed for the livestock in pen 20 amounted to three fillings of the portion of auger trough 12 overlying the pen 20 and that the quantity of feed required for the livestock in pen 18 corresponded to six fillings of the portion of auger tube 12 overlying the pen 18, the farmer would set the mastertime clock to drive the auger 15 for a period of time sufficieint to fill the entire tube 12 three times plus fill the portion of tube 12 overlying pen 18 three additonal times. Counter 25 would be set to trip switch 24 in response to a total of three signals from sensing means 26.

A feeding cycle would be as follows:

Auger 15 would distribute feed through container 12 over both pens. The first timer 21 would rotate trough 12 as the feed reached the end of the auger trough. This would discharge feed into both pens simultaneously and sensing device 26 would send the first signal to counter 25. All the animals in both pens could begin eating simultaneously. The auger 15 would refill trough 12; again, timer 21 would dump the trough as the feed reached the end of the auger trough, and sensing device 26 would send a second signal to counter 25 in response to the second trough rotation. Auger 15 would then refill the entire auger trough the third time and timer 21 would effect the third trough dumping rotation. The livestock in pen 20 would now have their required quantity of feed. In response to the third container dumping rotation, the sensing device 26 would send another signal to the counter 25. The counter 25, having accumulated a total of three signals would throw switch 24 deactivating timer 21 and activating timer 22. Auger 15 would continue to operate, moving feed along trough 12. Second timer 22 would effect a trough dumping rotation when the auger operated long enough to distribute feed through container 12 only as far as pen divider 28. Thus, the livestock in pen 18 would receive their fourth charge of feed. Fifth and sixth charges of feed would be delivered to pen 18 under the dumping control of second timer 22 prior to deactivation of the drive to auger 15 by the master time clock. All of the elements are self-resetting and the feeding system is therefore ready for the next feeding operation.

Obviously, the requirements of feeding systems such as this vary from one installation to the next depending on the size of the overall operation, the number, size, and type of animals in each of the quantitative feeding groups, and other factors peculiar to each individual installation. Thus, the number of operations referred to above in describing a complete feeding cycle is merely exemplary. The cycle control settings of the electromechanical control elements are determined on an individual basis for each system at the time of installation of the system and in accordance with the needs of the purchaser of that particular system.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. A method of feeding two groups of livestock having different quantitative feed requirements from a single feed supply source comprising, confining the groups in separate side by side feed pens with the group having the maximum feed requirement in a pen adjacent the feed supply source and the group having the minimum feed requirement in a pen more remote from the feed supply source, withdrawing feed from said supply source and conveying it in a line over said pens for a first period of time sufficient to distribute a substantially uninterrupted line of feed traversing both pens, then dumping said line of feed into said pens whereby all the livestock receive feed simultaneously, then repeating the withdrawing and conveying cycles each for the same period of time and following each conveying cycle with a dumping cycle until a desired total amount of feed has been deposited in said more remote pen, then withdrawing feed from said supply source and conveying it in said line for a second period of time shorter than said first period and sufficient to distribute a substantially uninterrupted line of feed over only the pen adjacent the supply source, then dumping said line of feed into said pen adjacent the supply source, and then repeating the withdrawing and conveying cycles for said shorter period of time and following each conveying cycle with a dumping cycle until a desired total amount of feed has been deposited in the adjacent pen.

2. A method for feeding groups of livestock having different feed consumption requirements comprising, confining the groups in separate linearly juxtaposed feeding areas in descending order of quantitative feed consumption, withdrawing feed from a supply source adjacent the maximum consumption feeding area and uniformly distributing the feed throughout the length of an elongated container extending above all the feeding areas, then dumping the container to deposit feed simultaneosuly into each feeding area, then repeating the distributing and dumping cycles until a desired total amount of feed has been deposited in the minimum consumption feeding area farthest from the supply source, then repeating the distributing cycle over a shorter period of time to distribute feed in the container above all the feeding areas except the minimum consumption area farthest from the feed supply source, then repeating the dumping cycle to deposit feed simultaneously into each feeding area except said minimum consumption area, and then repeating the distributing and dumping cycles over progressively shorter periods of time to progressively eliminate the remaining minimum consumption area from the distributing cycle and terminating the feeding operation when a desired total amount of feed has been deposited in the maximum consumption feeding area adjacent the feed supply source.

3. Apparatus for feeding groups of livestock having different feed consumption requirements comprising the combination of, means defining a first feeding pen for the group of livestock having the maximum feed requirement, means defining a second separate feeding pen and adjacent said first pen for the group of livestock having a lesser food requirement, a source of feed supply adjacent said maximum feed requirement pen, an elongated dumpable container extending in a line from said supply source over said first and second pens, conveyor means extending the length of said container operable to convey and distribute feed from said supply source along the length of said container, a first timer operable to actuate the dumping of said container when said conveyor has operated for a period of time sufficient to convey and distribute feed over both said first and second pens, a second timer operable to actuate the dumping of said container when said conveyor means has operated for a shorter period of time sufficient to convey and distribute feed through only the portion of said container overlying said first pen, switch means normally rendering said first timer active and said second timer inactive and operable when thrown to activate said second timer and deactivate said first timer, and counting means operable to throw said switch in response to a predetermined number of container dumps whereby feed is deposited simultaneously in both pens for a predetermined number of operating cycles under the control of said first timer and then additional feed is deposited in said first pen only for an additional number of operating cycles under the control of said second timer.

References Cited by the Examiner

UNITED STATES PATENTS

| | | | |
|---|---|---|---|
| 3,144,173 | 8/1964 | France et al. | 119—56 X |
| 3,149,610 | 9/1964 | Van Peursem | 119—51 |
| 3,173,400 | 3/1965 | Heitshu | 119—56 |

SAMUEL KOREN, *Primary Examiner.*

HUGH R. CHAMBLEE, *Examiner.*